United States Patent
Izumi

(10) Patent No.: US 7,978,832 B2
(45) Date of Patent: Jul. 12, 2011

(54) COMMUNICATING APPARATUS, CONTROL METHOD OF COMMUNICATING APPARATUS, AND CONTROL PROGRAM OF COMMUNICATING APPARATUS

(75) Inventor: Michihiro Izumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1165 days.

(21) Appl. No.: 10/564,841

(22) PCT Filed: Aug. 27, 2004

(86) PCT No.: PCT/JP2004/012776
§ 371 (c)(1),
(2), (4) Date: Jan. 12, 2006

(87) PCT Pub. No.: WO2005/022894
PCT Pub. Date: Mar. 10, 2005

(65) Prior Publication Data
US 2006/0274892 A1    Dec. 7, 2006

(30) Foreign Application Priority Data
Sep. 1, 2003 (JP) ................................. 2003-308189

(51) Int. Cl.
*H04M 11/00* (2006.01)
(52) U.S. Cl. .......... 379/100.15; 379/100.05; 379/100.13
(58) Field of Classification Search ........... 379/265.01–266.07, 100.01–100.15
See application file for complete search history.

(56) References Cited

U.S. PATENT DOCUMENTS

| | | | |
|---|---|---|---|
| 5,818,870 A | | 10/1998 | Yaguchi |
| 6,310,942 B1 * | | 10/2001 | Bashoura et al. ........ 379/100.14 |
| 6,359,903 B1 * | | 3/2002 | Shimade et al. ............. 370/468 |
| 6,463,135 B2 * | | 10/2002 | Abrishami et al. ...... 379/100.01 |
| 6,618,165 B1 * | | 9/2003 | Sehgal ........................ 358/1.15 |
| 6,961,137 B1 | | 11/2005 | Tamura |
| 2002/0095516 A1 | | 7/2002 | Nada |

(Continued)

FOREIGN PATENT DOCUMENTS

EP    1424836    6/2004

(Continued)

OTHER PUBLICATIONS

U.S. Appl. No. 10/569,505, filed Feb. 27, 2006.

*Primary Examiner* — Simon Sing
(74) *Attorney, Agent, or Firm* — Fitzpatrick, Cella, Harper & Scinto

(57) ABSTRACT

In a communicating apparatus which makes speech and image communication, a proper communication path is selected by a simple construction of a low cost, thereby enabling data communication of a high-speed and high reliability to be performed. If a telephone number of an opponent station corresponds to an VoIP network, a communicating apparatus obtains an IP address of the opponent station from an SIP proxy server and sends and receives communication data on an IP network to/from the opponent station by a file sending/receiving protocol such as FTP, HTTP, or the like. If the telephone number of an opponent station does not correspond to the VoIP, image data is facsimile-modulated, a digital encoding method (64 kbps PCM encoding) suitable for a facsimile modulating method is selected, and an analog facsimile signal obtained by the facsimile modulation is digitally encoded and sent to the opponent station through a media gateway for executing analog/digital signal conversion between the IP network and a public line network.

12 Claims, 14 Drawing Sheets

U.S. PATENT DOCUMENTS

2004/0196506 A1    10/2004   Izumi
2006/0155864 A1    7/2006   Izumi

FOREIGN PATENT DOCUMENTS

| | | |
|---|---|---|
| GB | 2370719 | 3/2002 |
| JP | 4-109736 | 4/1992 |
| JP | 09-247334 | 9/1997 |
| JP | 10-107938 | 4/1998 |
| JP | 10-133967 | 5/1998 |
| JP | 2000-332940 | 11/2000 |
| JP | 2000-354127 | 12/2000 |
| JP | 2001-160866 | 6/2001 |
| JP | 2001-197279 | 7/2001 |
| JP | 2002-101198 | 4/2002 |
| JP | 2003-158618 | 5/2003 |
| JP | 2003-169186 | 6/2003 |
| WO | 03/21911 | 3/2003 |

* cited by examiner

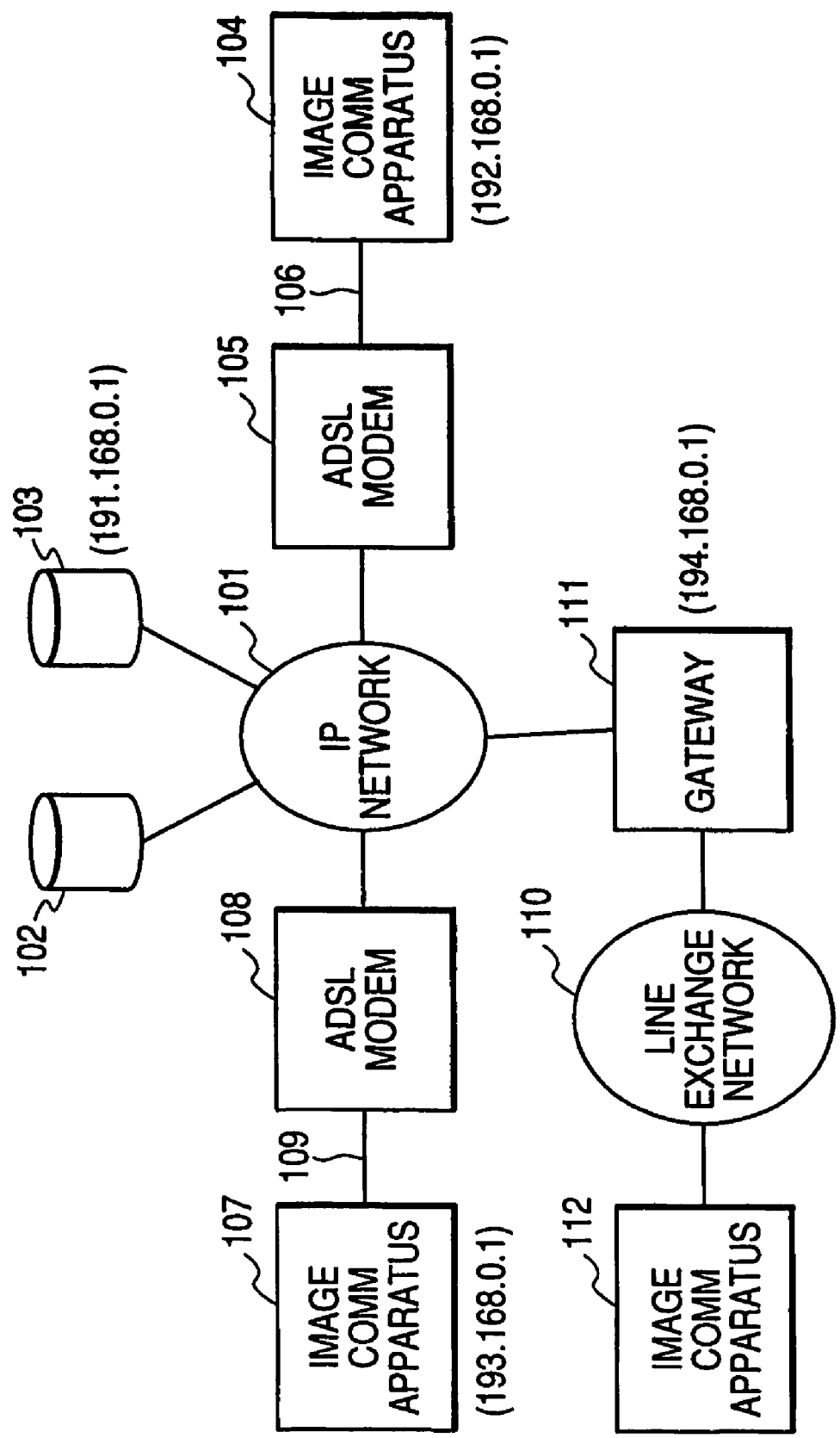

FIG. 9

| OPERATION MODE | 901 IMAGE COMM VIA IP NETWORK | 902 SPEECH COMM VIA IP NETWORK | 903 IMAGE COMM VIA TEL NETWORK | 904 SPEECH COMM VIA TEL NETWORK |
|---|---|---|---|---|
| SELECTOR | MODEM CODEC NOT USED | SELECT A/D CONVERTER | SELECT TONE GENERATOR UNIT AND MODULATION PROCESSING UNIT | SELECT A/D CONVERTER |
| DIGITAL ENCODING UNIT | MODEM CODEC NOT USED | ARBITRARY ENCODING METHOD | 64 Kbps PCM ENCODING | ARBITRARY ENCODING METHOD |

US 7,978,832 B2

COMMUNICATING APPARATUS, CONTROL METHOD OF COMMUNICATING APPARATUS, AND CONTROL PROGRAM OF COMMUNICATING APPARATUS

This application is a National Stage filing under 35 U.S.C. §371 of International Application No. PCT/JP2004/012776, filed Aug. 27, 2004, which in turn claims priority to Japanese Application No. 2003-308189, filed Sep. 1, 2003, the priority of which is hereby claimed, said International Application having been published in English, as International Publication No. WO 2005/022894 A1 on Mar. 10, 2005.

TECHNICAL FIELD

The invention relates to a communicating apparatus which makes speech and image communication and corresponds to an analog communication path and a network communication path and also a control method and a control program of such a communicating apparatus.

BACKGROUND ART

In recent years, a broadband communication line such as an ADSL which can send data at a high speed has been spread. The ADSL is characterized in that the same metallic cable as a telephone line is used as a subscriber's line, so that the same line can be used for both an analog telephone service and a network connecting service. That is, by inserting a filter called a splitter for dividing a frequency between the communication line and a communication terminal, the line can be separated into a line for sending a speech band signal and a line for sending digital data.

In the case of using the same line for the analog telephone service, although various constructions such as (ADSL modem+splitter+computer), (ADSL modem+splitter+router), . . . are possible as constructions of apparatuses of the subscribers, a construction in which, for example, portions of (ADSL modem+splitter) are integrated is possible as an ADSL gateway taking into consideration use as a telephone in common.

According to such an ADSL gateway, for example, a modular jack is provided so that an analog telephone can be connected to the line which sends a speech band signal and a communicating apparatus like a telephone or a facsimile is connected to the modular jack, thereby enabling communication to be made.

For the high-speed digital communication, a connecting interface of CSMA/CD (for example, Ethernet (trademark)) is provided for the ADSL gateway. By connecting a PC (personal computer) or the like to the CSMA/CD interface, data can be downloaded from the WWW server or the like at a high speed. Not only the CSMA/CD interface but also an interface such as a USB is used as an interface between the line and the network apparatus such as a PC.

Although a terminal such as a PC which is used to be connected to a server can make high-speed communication, a terminal such as telephone or facsimile for sending and receiving data in a real-time manner to/from an opponent terminal via a line exchange network (analog communication path) uses an analog band. While there are cases that do not become problems in an analog facsimile procedure of binary (black and white) image data or the like, there is a problem of requiring a long communication time in the case of sending color image (in a JPEG format or the like) data of a large capacity obtained by photographing an object with a digital camera or the like.

The high-speed transmission can be realized for sending communication data such as image data or the like at a high speed with such a procedure that the facsimile is connected to the CSMA/CD interface, the image data is uploaded as packets to a file server (for example, a protocol such as FTP, HTTP, or the like is used), and the opponent terminal downloads the image data from the server. In such a case, however, there is such a problem that since the reception side needs to execute the process to access to the server in order to receive the data, real-time performance of the communication is lost. In the case of notifying the server of a destination address of the receiving side or downloading the data on the initiation of the receiving side, a mechanism for notifying the receiving side of the uploading of the data, or the like is necessary. It is difficult to realize the communication with a simple operation of merely designating a telephone number of an opponent destination as in the conventional facsimile apparatus.

In consideration of the above problems, a technique for making image communication via servers on an IP network has been disclosed in Japanese Patent Application Laid-Open No. H10-107938 (the following Patent Document 1). That is, a first terminal of a sending side of an image calls the server in which the first terminal is included, the first terminal is connected to a computer network through the server in which the first terminal is included, and a second terminal serving as a receiving side of the image is designated, while a server of a network in which the second terminal calls the second terminal is included, the first terminal sends the image data to the server in which the second terminal is included through the computer network in a format suitable for the computer network, the server in which the second terminal is included converts the image data in the format adapted to the computer network into facsimile image data and sends it to the second terminal through a public line, and the second terminal reproduces the image from the facsimile image data.

Many methods of sending an image in an E-mail format by inputting an Internet address of a sending destination have been proposed in Japanese Patent Application Laid-Open No. H09-247334 (the following Patent Document 2), Japanese Patent Application Laid-Open No. H10-133967 (the following Patent Document 3), and the like.

Further, methods of relaying facsimile image transmission on the Internet in a real-time manner by applying the ITU-T Recommendation T.38 have been proposed in Japanese Patent Application Laid-Open No. 2000-354127 (the following Patent Document 4), Japanese Patent Application Laid-Open No. 2001-197279 (the following Patent Document 5), and the like.

[Patent Document 11] Japanese Patent Application Laid-Open No. H10-107938
[Patent Document 2] Japanese Patent Application Laid-Open No. H09-247334
[Patent Document 3] Japanese Patent Application Laid-Open No. H10-133967
[Patent Document 4] Japanese Patent Application Laid-Open No. 2000-354127
[Patent Document 5] Japanese Patent Application Laid-Open No. 2001-197279
[Patent Document 6] Japanese Patent Application Laid-Open No. H04-109736

DISCLOSURE OF THE INVENTION

However, in the Patent Document 1, it is necessary to input the terminal number of the sending destination after the terminal of a sending source side is dial-up connected to the server and a log-in process including an authenticating procedure or the like is executed. Therefore, such a construction that the image is sent merely by inputting the telephone number as in the conventional facsimile cannot be realized.

In the Patent Documents 2 and 3, it is necessary to input an E-mail address in the case of sending data via the Internet. There is also such a problem that since the image is sent by E-mail, the image data is accumulated in the server and the receiving side needs to access the server by an E-mail reading protocol such as a POP (Post Office Protocol) or the like and receive.

Further, in the Patent Documents 4 and 5, since the dedicated gateway for processing the protocol of ITU-T Recommendation T.38 is necessary and an ordinary telephone line is used between the terminal and the Internet, a transmission speed is equal to that in the case of the facsimile communication using the conventional telephone line exchange network.

To solve the above problems, there is a method whereby, for example, a construction as shown in FIG. 2B is used, an environment of VoIP (Voice Over Internet Protocol) is used, and the high-speed image communication is made in a realtime manner by the operation similar to that of the conventional facsimile. FIG. 2B shows component members for image communication arranged around a system bus of an image communicating apparatus.

In the construction in FIG. 2B, a function of an SIP proxy (or gate keeper) of the VoIP network is used, an IP address corresponding to the telephone number of the sending destination side is obtained, and the image data converted into a predetermined file format is sent to the terminal of the sending destination side via a LAN controller 1216 . . . the CSMA/CD interface.

When making communication with a facsimile apparatus which is not connected to the VoIP network, a transmission image is modulated by a facsimile modem 1207, a generated analog signal is digitally encoded by a codec 1210 for VoIP and subsequently converted into packets, and the converted packets are sent via the LAN controller 1216 . . . the CSMA/CD interface by using a procedure similar to VoIP speech communication.

In the case of making the inherent VoIP speech communication, a speech input/output unit 1208 such as a handset or the like is connected to the codec 1210 for VoIP through a switch 1209, thereby making the VoIP speech communication.

However, when communicating with the facsimile apparatus which is not connected to the VoIP network by such a construction, the signal is modulated by the facsimile modem and the modulated analog signal is digitally encoded by the codec for VoIP and sent, so that there are the following problems.

(1) Since the facsimile modem needs to be installed even when a frequency of the communication with the facsimile apparatus which is not connected to the VoIP network is low, cost performance is low.

(2) Since many converting processes (the digital image signal→the analog modulation signal→the digital coded data) are necessary, a circuit scale is large and a data processing amount is large.

In the above Patent Document 6, there has been disclosed a construction in which frequency converting means is arranged between modulating means for modulating a digital image signal and encoding means and a transmission image is encoded in a speech codec format without executing wasteful analog conversion (in FIG. 2B, analog transmission between the facsimile modem 1207 and the codec 1210 for VoIP).

However, according to the invention of the Patent Document 6, consideration is given only to the image transmission and a system for communicating a speech and an image is not considered. Therefore, to apply the construction of the Patent Document 6 to an apparatus which needs to send both a speech and an image, different digital encoding units have to be provided for the speech and the image.

In the construction of the Patent Document 6, since no consideration is given to a point that there is a possibility that a plurality of encoding methods of different transmission speeds like a VoIP are selected, there is also a case where quantization errors which are caused by the digital encoding are large and the image communication cannot be normally made in dependence on the modulating method of the image.

In consideration of the above problems, it is an object of the invention to provide a communicating apparatus which makes speech and image communication and corresponds to an analog communication path and a network communication path, wherein a proper communication path can be selected and data communication of a high speed and high reliability can be made by a simple construction of a low cost.

To solve the above problems, according to the invention, when image data is sent to an opponent station, if the opponent station has an IP address, there is selected a first image communicating procedure by which the image data is not facsimile-modulated but sent and received to/from the opponent station on an IP network on the basis of a predetermined IP communication protocol by using the IP address of the opponent station obtained from a predetermined server on the basis of a telephone number of the opponent station, and if the opponent station does not have the IP address, there is selected a second image communicating procedure by which the image data is facsimile-modulated by a predetermined facsimile modulating method, a digital encoding method of digital encoding means is switched to a digital encoding method suitable for the facsimile modulating method, an analog facsimile signal obtained by the facsimile modulation is digitally encoded by the digital encoding means, and subsequently, the digital coded signal is sent to the opponent station through a media gateway for executing analog/digital signal conversion between the IP network and a public line network.

By using the characteristic construction as mentioned above, according to the invention, the following advantages are obtained: a large amount of image data Can be sent to the opponent station at a high speed by using the first image communicating procedure without using the facsimile procedure, and when the image communication is made by the second image communicating procedure, the digital encoding method that is optimum to the facsimile modulating method is selected and the image communication of high reliability can be made with the opponent station through the media gateway.

BRIEF DESCRIPTION OF THE DRAWINGS

FIG. 1 is a block diagram showing a construction of a network system including image communicating apparatuses using the invention.

FIG. 9 is an explanatory diagram showing an encoding method which is used in the image communicating apparatus 104 in FIG. 1.

BEST MODE FOR CARRYING OUT THE INVENTION

Figure 2A:
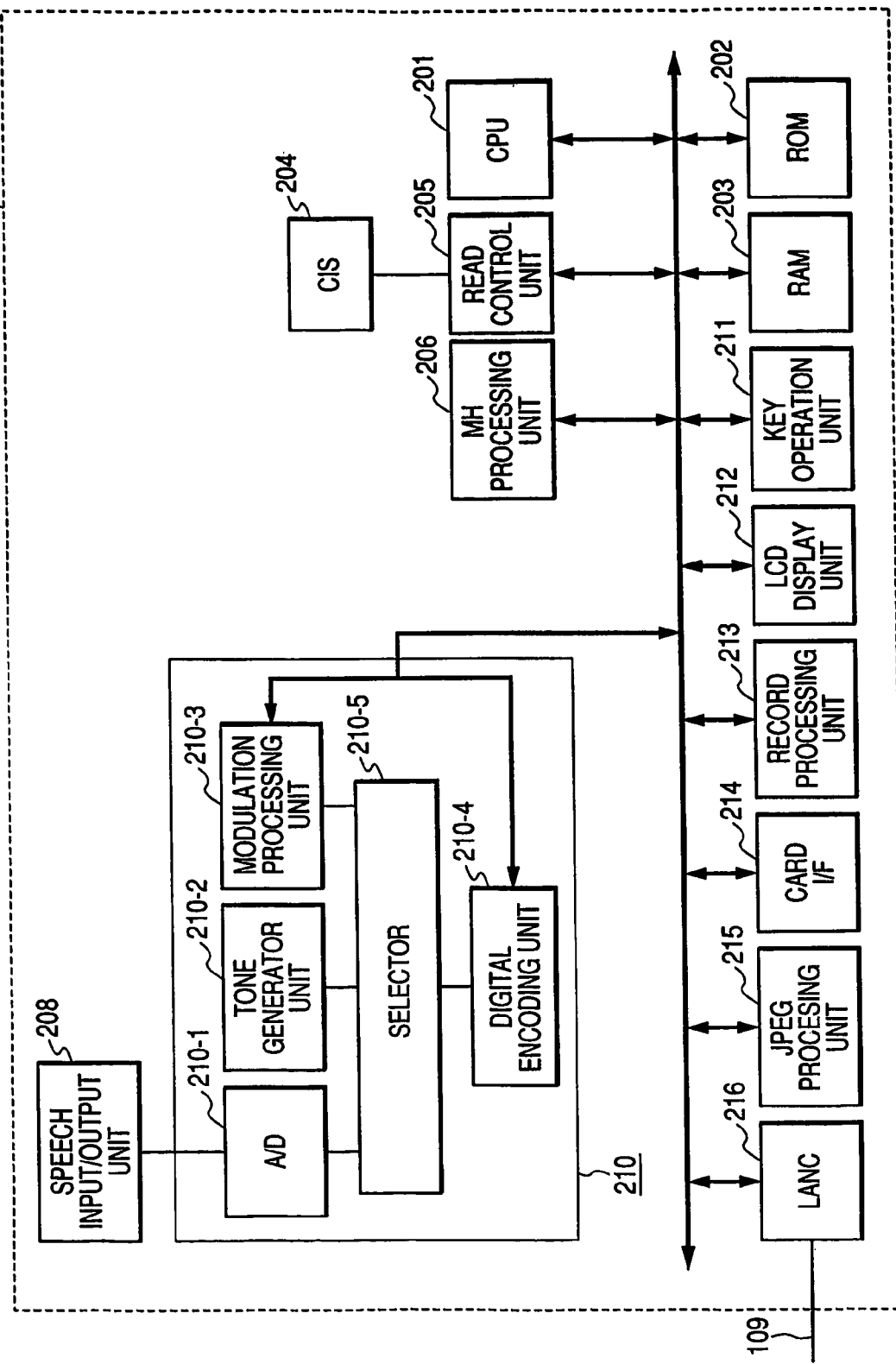
FIG. 2A is a block diagram showing an internal construction of the image communicating apparatus using the invention.

The invention will be described in detail hereinbelow on the basis of embodiments shown in the drawings. The invention can be applied to a communicating apparatus which makes speech and image communication and corresponds to an analog communication path and a network communication path. An embodiment regarding the communicating apparatus constructed as a dedicated apparatus and a control method and a control program of such a communicating apparatus is shown below.

Embodiment 1

FIG. 1 shows a construction of a network system to which the embodiment can be applied. In FIG. 1, reference numeral 101 denotes Internet (hereinafter, referred to as an IP network) and 102 indicates a DNS (Domain Name Service) server for executing a process for converting a domain name into an IP address.

Reference numeral 103 denotes an SIP proxy (global IP address: 191.168.0.1) for VoIP which provides an SIP (Session Initiation Protocol) service for executing a call connecting process in an IP telephone service.

Reference numeral 104 denotes a first image communicating apparatus (global IP address: 192.168.0.1) which operates as a calling/image sending apparatus in the embodiment. A detailed construction of the image communicating apparatus 104 will be described hereinafter with reference to FIGS. 2A and 2B.

Reference numeral 105 denotes an ADSL modem having therein: an analog telephone interface for connecting an analog telephone; and an Ethernet interface for sending and receiving digital data. The ADSL modem 105 has a function for multiplexing a speech band signal that is sent via the analog telephone interface and a signal of a band out of the speech band that is sent via the Ethernet interface, modulating the multiplexed signal, and sending the modulated signal to a communication line. The ADSL modem 105 also has a function for separating the signal received from the communication line into the speech band signal and the out-of-speech band signal and outputting them to the analog telephone interface and a CSMA/CD (for example, Ethernet (trademark)) interface, respectively.

Reference numeral 106 denotes a CSMA/CD interface for connecting the ADSL modem 105 and the image communicating apparatus 104; 107 a second image communicating apparatus (global IP address: 193.168.0.1); 108 an ADSL modem; 109 a CSMA/CD interface; 110 a telephone line exchange network; 111 a media gateway for connecting the IP network 101 to the telephone line exchange network 110 and executing a data converting process; and 112 an image communicating apparatus such as a facsimile apparatus or the like which is connected to the telephone line exchange network. The image communicating apparatuses 107 to 112 operate as a call-in/image receiving apparatus in the embodiment.

The media gateway 111 executes an analog/digital signal conversion between the IP network and the public line network and is installed by a service provider, particularly, by an Internet service provider or the like which provides the IP telephone service. In the embodiment, it is assumed that the media gateway 111 has: connecting means (a CSMA/CD interface or a higher-speed interface) like a LAN controller 216 (FIG. 2A) for connecting to the Internet side, which will be explained hereinafter; interface means with the telephone line exchange network 110; and further, signal converting means which supports the same digital encoding method as that of a modem codec 210 (FIG. 2A), which will be explained hereinafter.

When an IP telephone calling destination from a terminal (for example, the image communicating apparatus 104) in a network of the Internet service provider of a person who has installed the media gateway 111 is a subscriber's terminal (for example, the image communicating apparatus 112) of the telephone line exchange network 110, the media gateway 111 executes a responding process of the SIP protocol and, thereafter, executes the analog/digital signal conversion between a calling terminal of the IP network 101 side and a call-in terminal on the side of the telephone line exchange network 110. At this time, a signal which is sent and received to/from the IP network 101 is a (speech) data signal which has been digitally encoded on the basis of the VoIP standard, and the signal which is sent and received to/from the telephone line exchange network 110 is an analog signal of the speech band.

With respect to the calling from the telephone line exchange network 110 side, the line provider of the telephone line exchange network 110 analyzes a telephone number (based on an IP telephone number starting with, for example, a "050" prefix). Thus, if the destination is the subscriber in the network of the person who has installed the media gateway 111, the calling is routed to the media gateway 111. After that, the terminal in the network of the installing person of the media gateway 111 is called on the basis of the SIP protocol. In the calling/call-in control between the IP network 101 and the telephone line exchange network 110 as mentioned above, a No. 7 common line signal system is used between the media gateway 111 and an intra-office exchange of the telephone line exchange network 110 side.

Figure 2B:
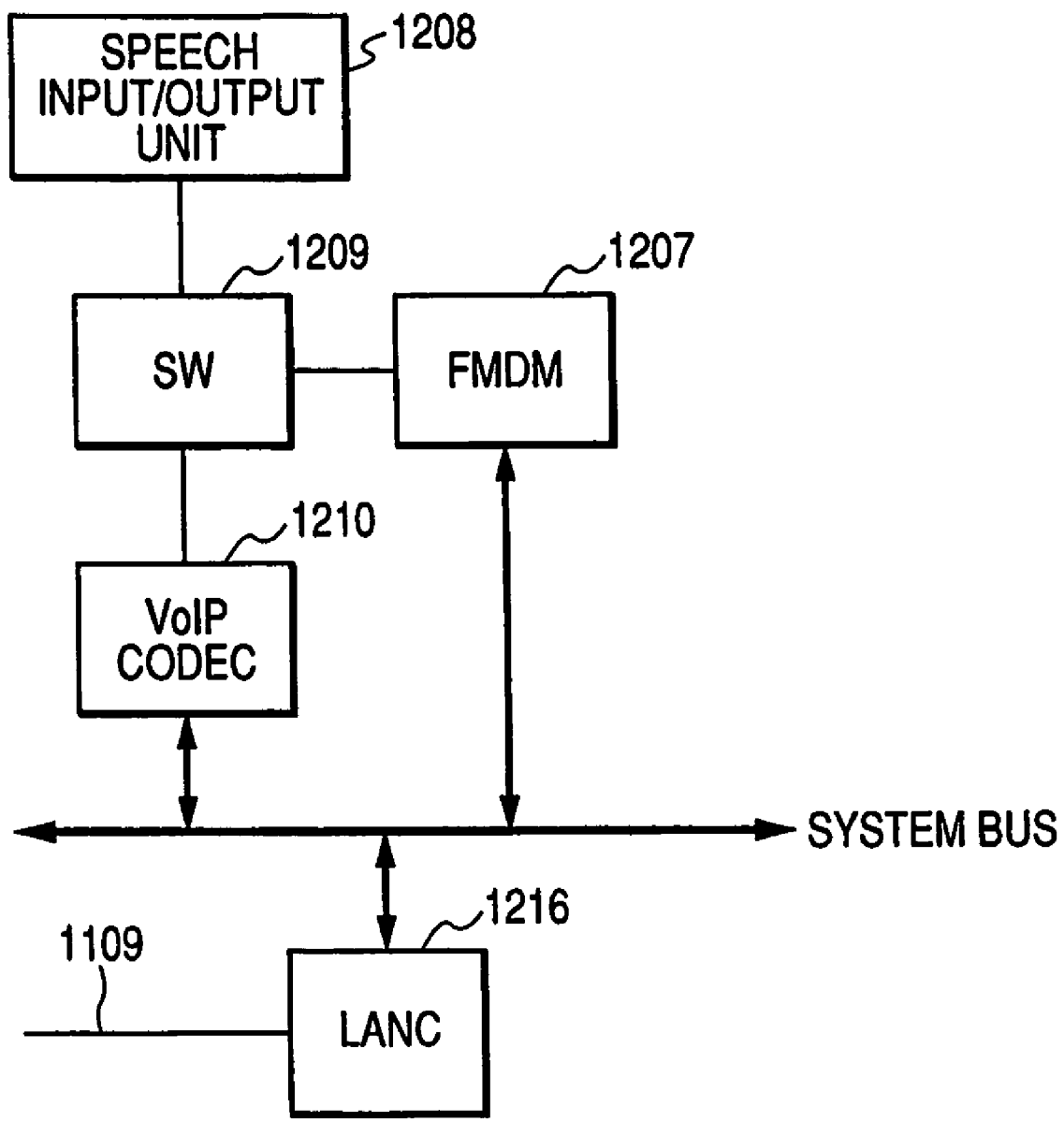
FIG. 2B is a block diagram showing an internal construction of a conventional image communicating apparatus.

FIG. 2A shows a construction of the image communicating apparatus (104 or 107 in FIG. 1) using the invention. In the diagram, reference numeral 201 denotes a CPU for controlling the image communicating apparatus in accordance with a program stored in a ROM 202. The CPU 201 also executes a protocol process of TCP/IP and an assembling process of the image data into a TCP/IP frame is executed by a control of the CPU 201. Reference numeral 203 denotes a RAM which is used as a work memory upon execution of the program and also used for buffering the image data which is sent/received.

Reference numeral 204 denotes a CIS (Contact Image Sensor) which is constructed by an optical sensor and a document feeding mechanism, reads out an image on an original, and converts the read image into an analog image signal. A read control unit 205 converts the analog signal outputted from the CIS 204 into digital data. The converted digital data is transferred to the RAM 203 by the control of the CPU 201.

Reference numeral 206 denotes an MH encoding/decoding processing unit for MH encoding the read image data and compressing it in the image sending mode and decoding the MH encoded image data in the receiving mode.

Reference numeral 208 denotes a speech input/output unit (handset) constructed by a microphone for inputting a voice sound and a speaker for generating the voice sound.

Reference numeral 210 denotes the modem codec constructed by: an A/D converter 210-1 for digitally converting the speech analog signal into a digital signal for a digital signal process; a tone generator unit 210-2 for generating a tone such as a CNG or the like that is necessary for a facsimile sending procedure specified by ITU-T Recommendation T.30; a modulation processing unit 210-3 for modulating the image data which is inputted via a data bus; a digital encoding unit 210-4; and a selector 210-5 for selecting one of signal sources inputted to the digital encoding unit 210-4.

The digital encoding unit 210-4 is a characteristic portion of the invention and provided for executing the digital encoding suitable for each of the speech signal and the facsimile signal. The digital encoding unit 210-4 supports each of the encoding methods such as 64 kbps: PCM (G.711), 16 kb/sec: LD-CELP (G.728), 8 kb/sec: CS-ACELP (G.729/G.729a), 6.3 kb/sec: MP-MLQ (G.723.1), and 5.3 kb/sec: A-CELP (G.723.1) which are used in VoIP and can executes the digital encoding process at one of those sampling rates.

Reference numeral 211 denotes a key operation unit constructed by a dial, operation buttons for the facsimile transmission/reception, and the like. Reference numeral 212 denotes a liquid crystal display unit.

Reference numeral 213 denotes a record processing unit for converting the received image data into raster data for printing and printing. An arbitrary method can be used as a recording method of the record processing unit 213, for example, an electrophotographic method or an ink jet method.

Reference numeral 214 denotes a card interface to which a memory card in which JPEG images photographed by a digital camera have been stored can be connected.

Reference numeral 215 denotes a JPEG processing unit which can JPEG compress a JPEG image inputted via a card interface or decompress the received JPEG image data.

Reference numeral 216 denotes a LAN controller for sending and receiving data to/from the ADSL modem via the CSMA/CD interface 106 (109). When the data to be sent is transferred to the LAN controller 216, the LAN controller 216 adds an MAC (Media Access Control) frame header and control data such as an FCS (Frame Check Sequence) and the like to the data and, subsequently, sends the resultant data to the CSMA/CD interface.

The communication control in the above construction will now be described. Processes in the case of sending the image from the first image communicating apparatus 104 to the second image communicating apparatus 107 and the third image communicating apparatus 112 will now be described hereinbelow. Explanation will now be made on the assumption that the JPEG image data obtained by photographing an object by the digital camera is sent to the second image communicating apparatus 107 and the image data read by the scanner is sent as a G3 facsimile image (MH encoded image) to the third image communicating apparatus 112.

Figure 4A:
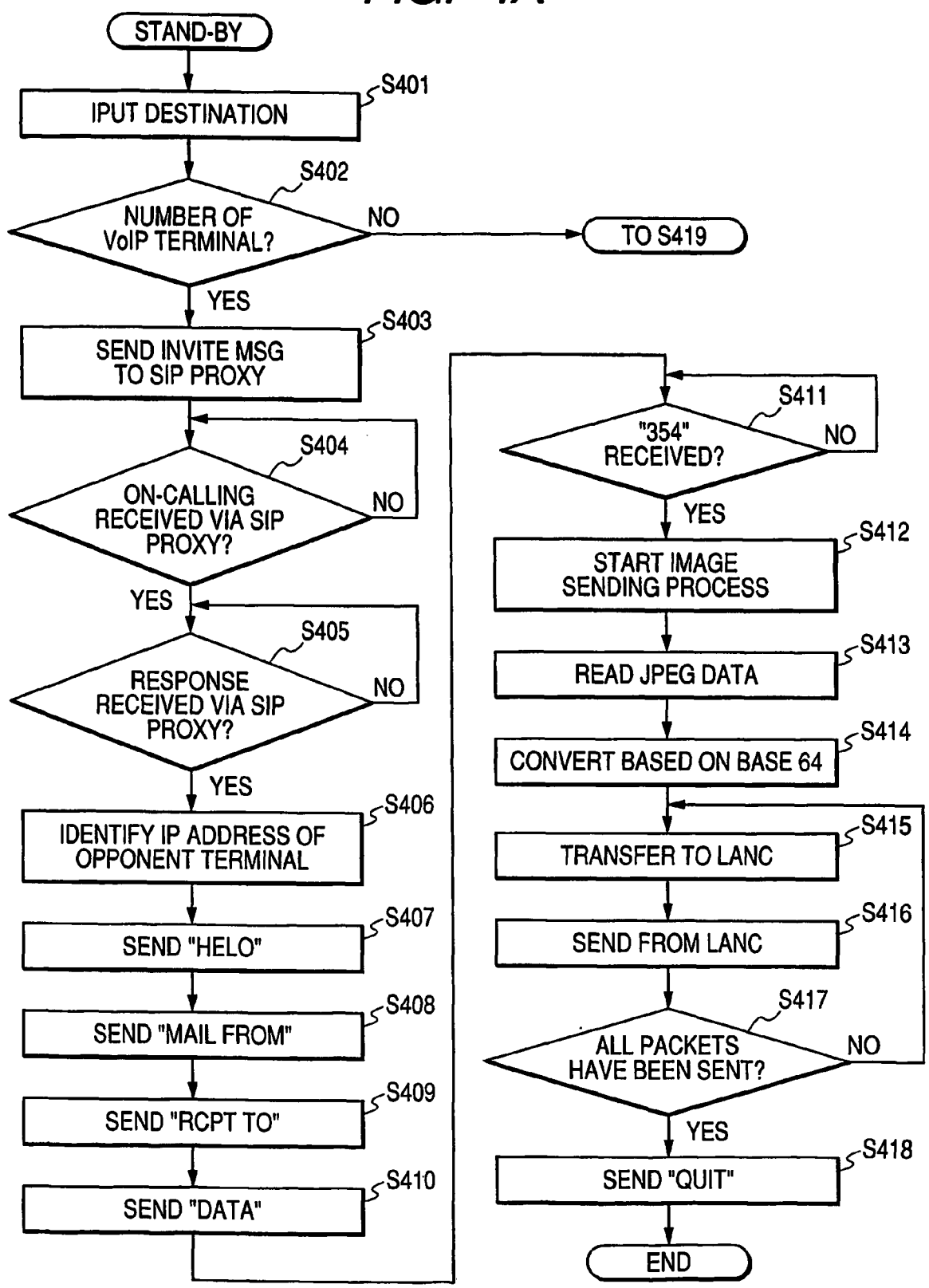
FIG. 4A is a flowchart showing a communication control of the image communicating apparatus 104 in FIG. 1.
Figure 4B:
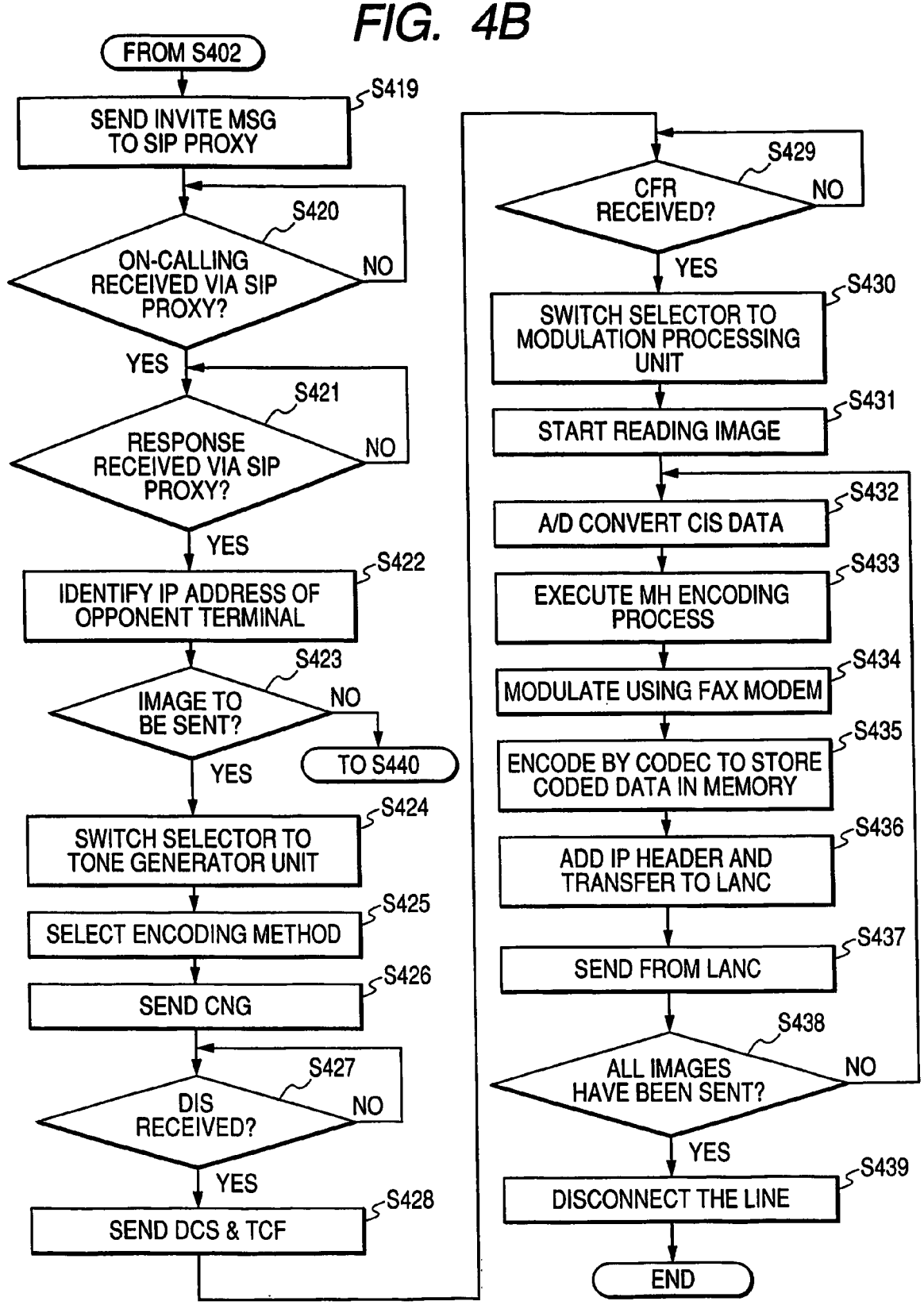
FIG. 4B is a flowchart showing the communication control of the image communicating apparatus 104 in FIG. 1.
Figure 4C:
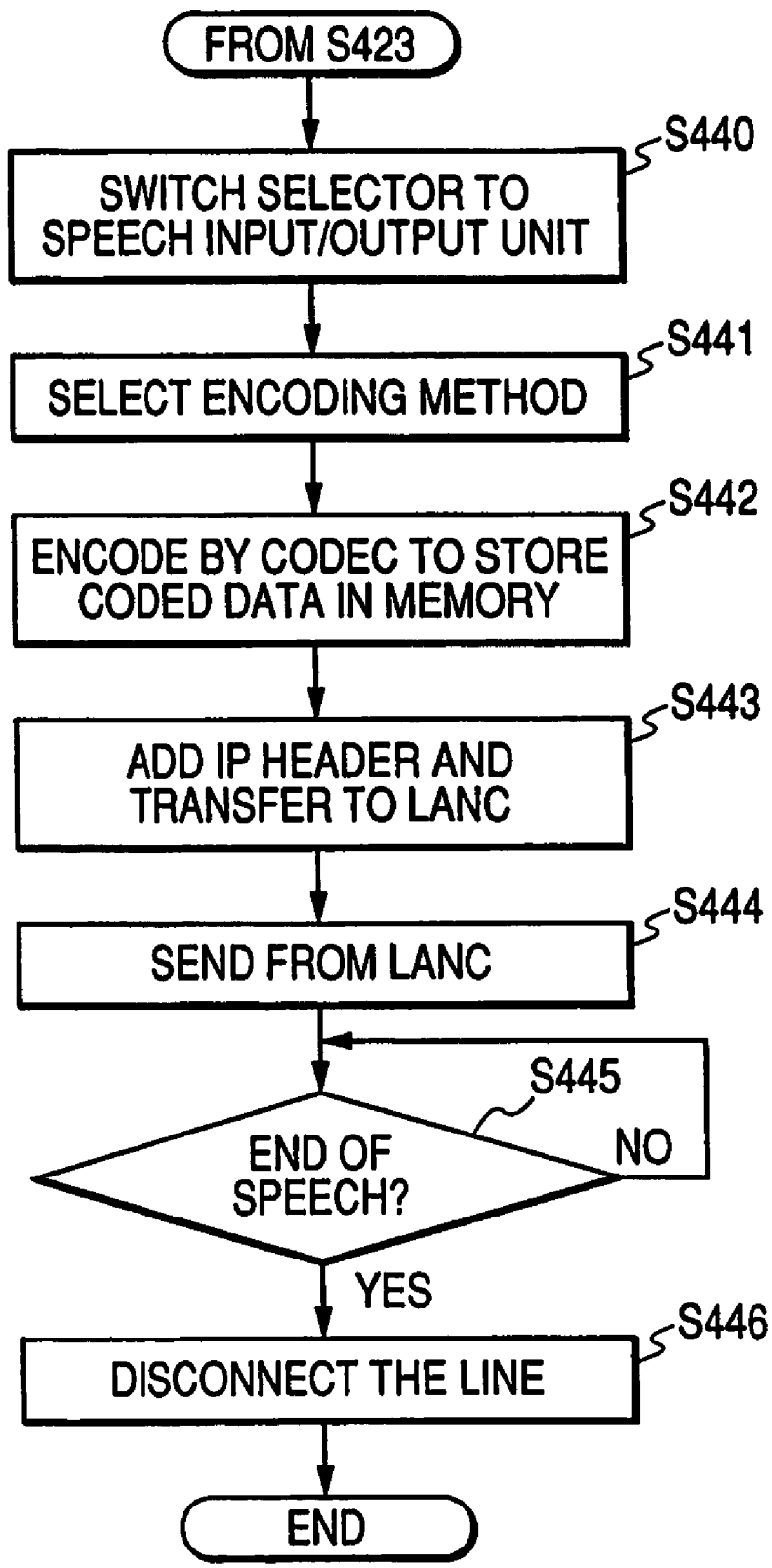
FIG. 4C is a flowchart showing the communication control of the image communicating apparatus 104 in FIG. 1.
Figure 5:
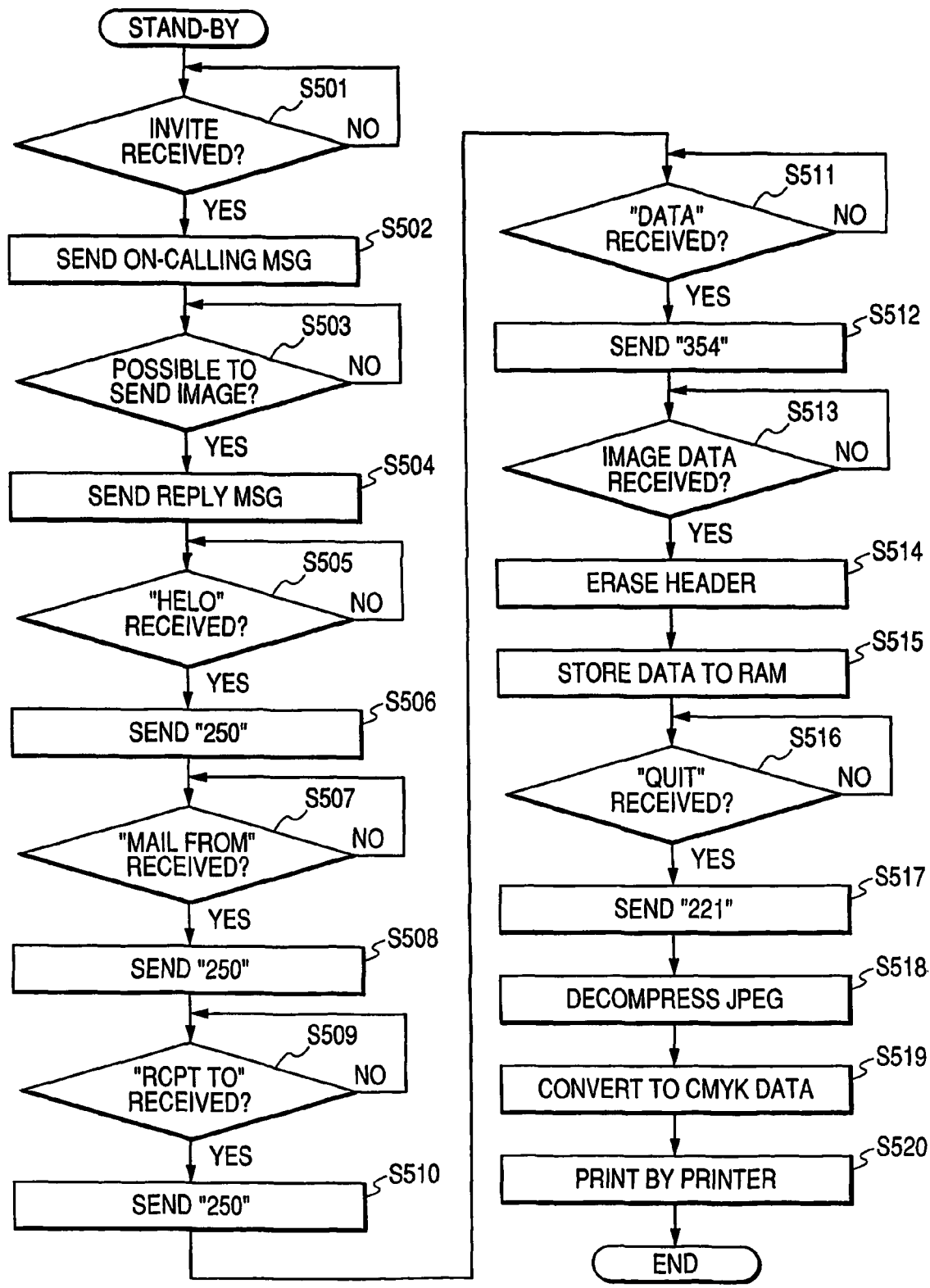
FIG. 5 is a flowchart showing a communication control of the image communicating apparatus 107 in FIG. 1.
Figure 6:
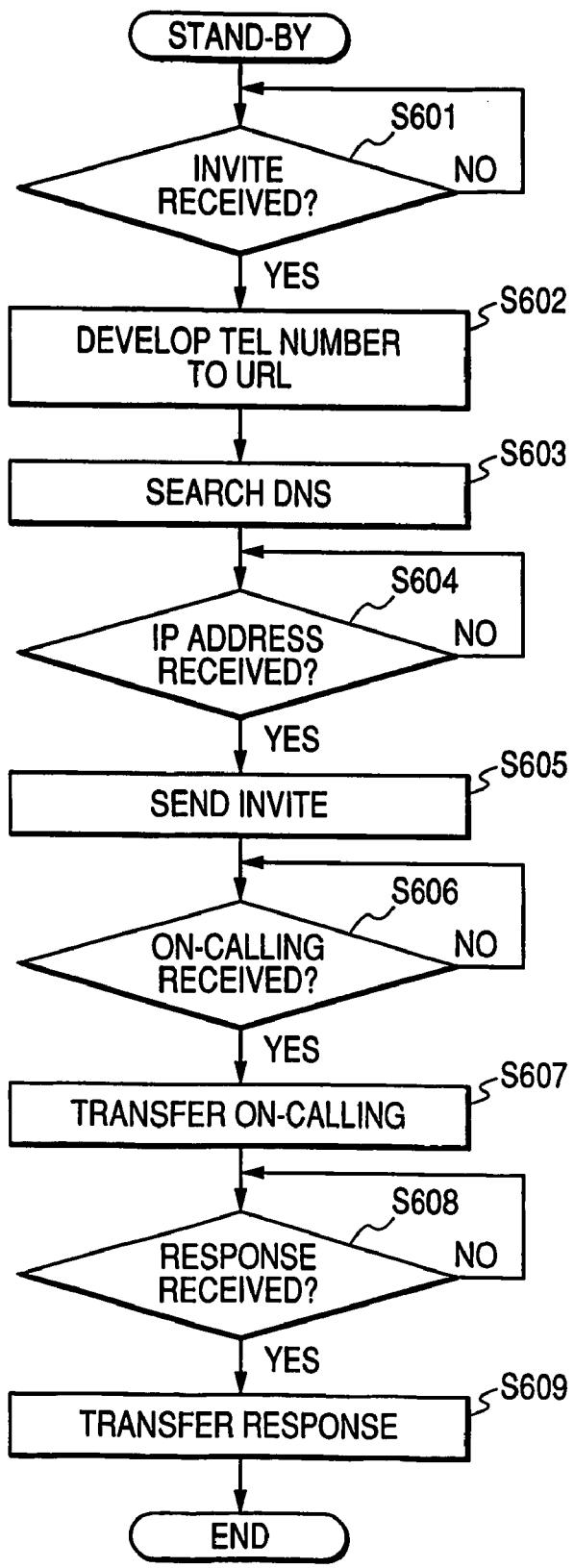
FIG. 6 is a flowchart showing a communication control of an SIP proxy in FIG. 1.
Figure 7:
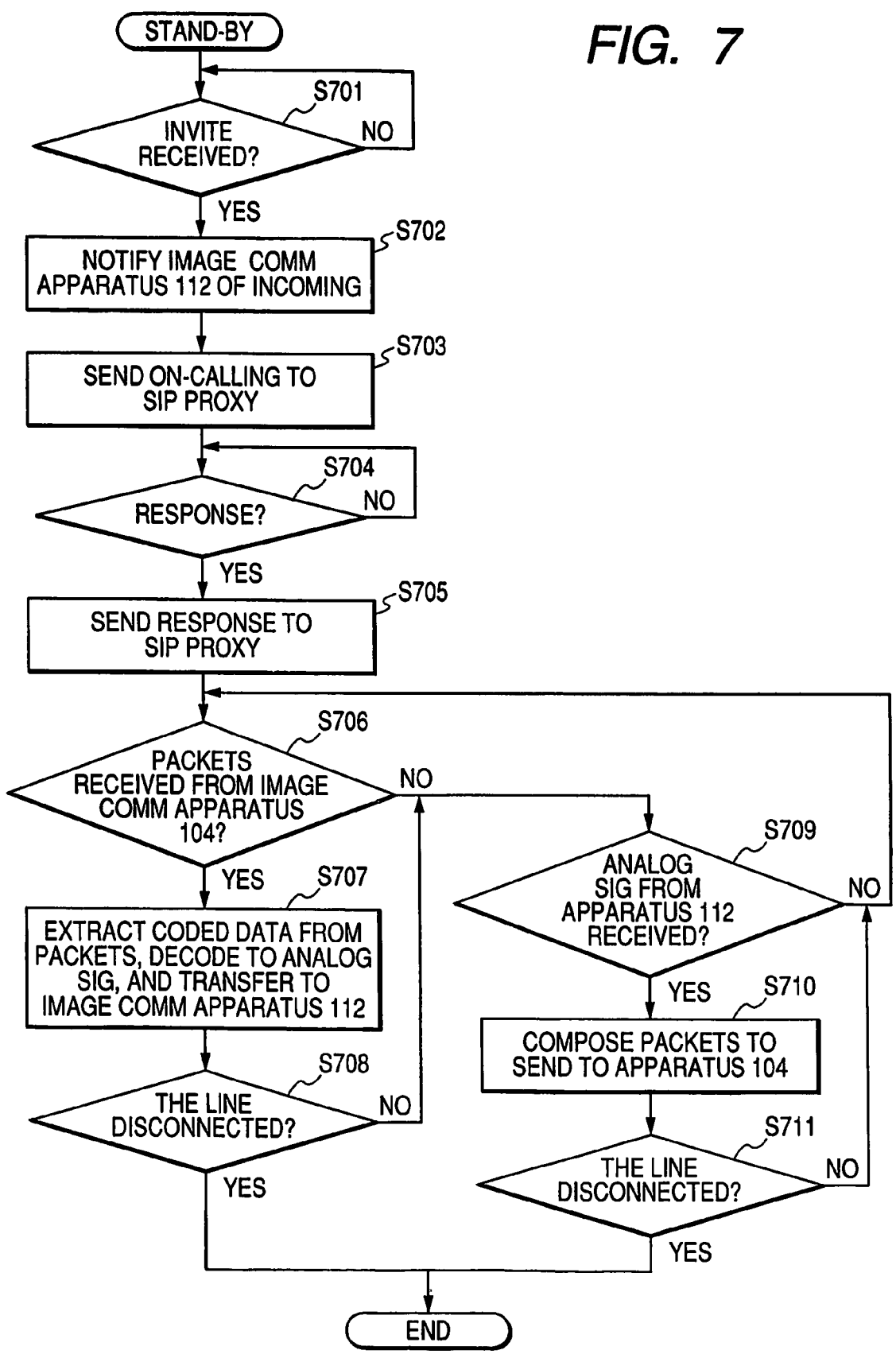
FIG. 7 is a flowchart showing a communication control of a media gateway 111 in FIG. 1.
Figure 8:
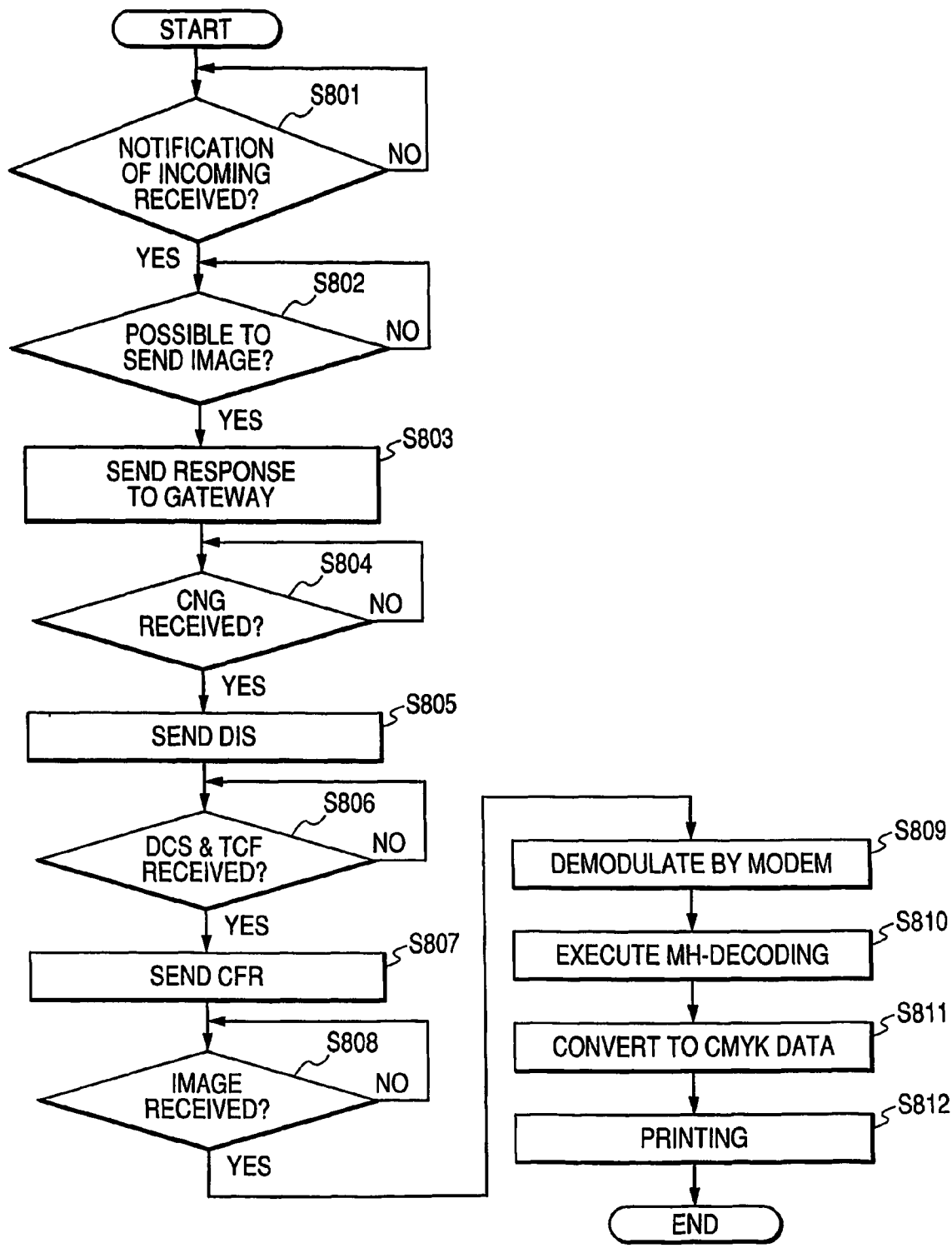
FIG. 8 is a flowchart showing a communication control of the image communicating apparatus 112 in FIG. 1.

FIGS. 4A, 4B, and 4C show a communication control procedure which is executed by the image communicating apparatus (104). FIG. 5 shows a communication control procedure which is executed by the image communicating apparatus (107). FIG. 6 shows a communication control procedure which is executed by the SIP proxy 103. FIG. 7 shows a communication control procedure which is executed by the media gateway 111. FIG. 8 shows a communication control procedure which is executed by the image communicating apparatus (112). The procedures shown in those diagrams are stored as control programs of the CPU 201 into the ROM 202 and executed by the CPU 201 (in the case of the image communicating apparatus 104, similar storing media are used in the other apparatuses.) However, a storing location of the program for realizing the communication control procedure in the embodiment is not limited to the ROM. A path for supplying the program can be stored in the ROM at the time of shipping or can be also supplied or updated via another storing medium or through a network.

Figure 3A:
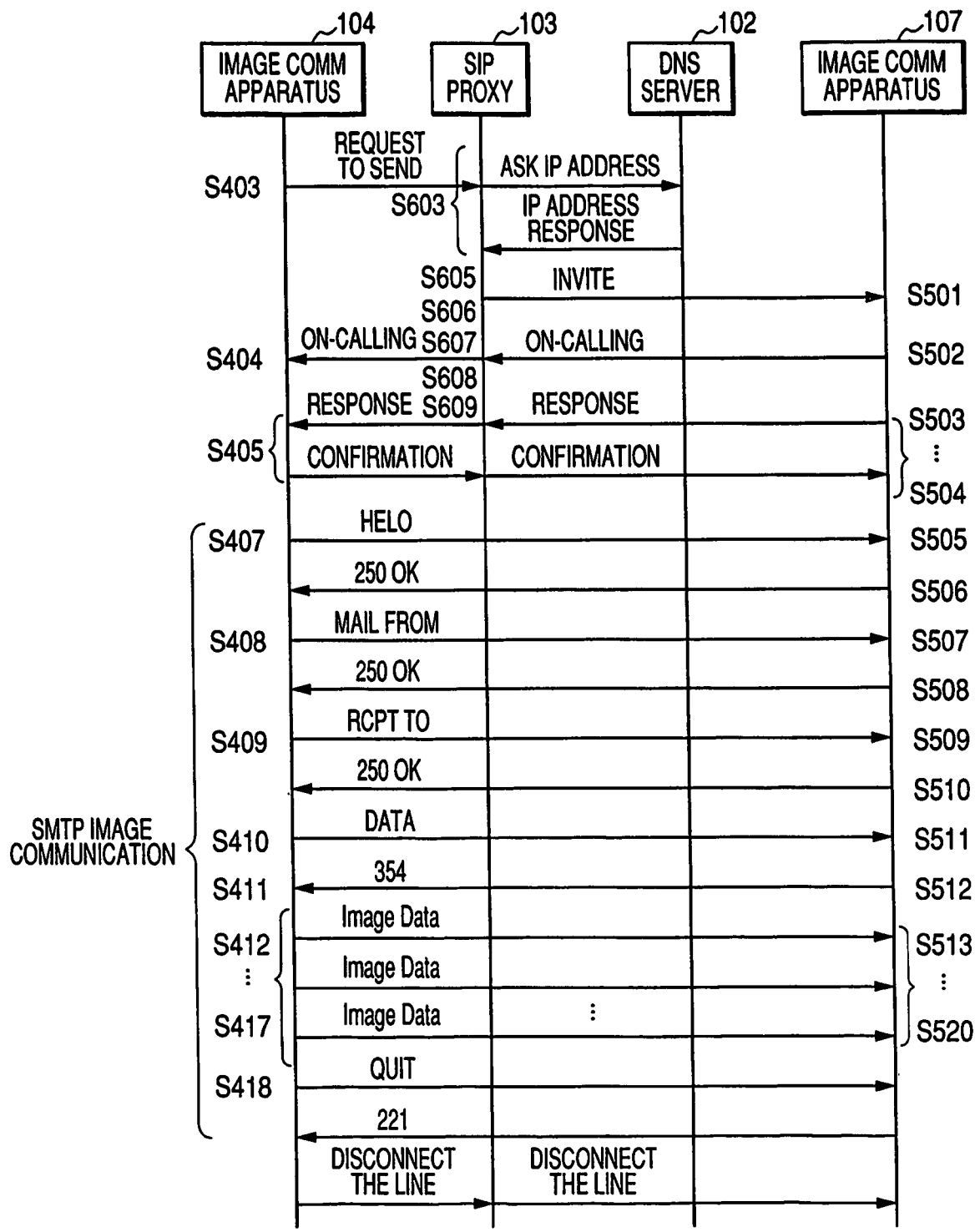
FIG. 3A is an explanatory diagram showing a communication sequence for sending an image from an image communicating apparatus 104 in FIG. 1 to an image communicating apparatus 107.
Figure 3B:
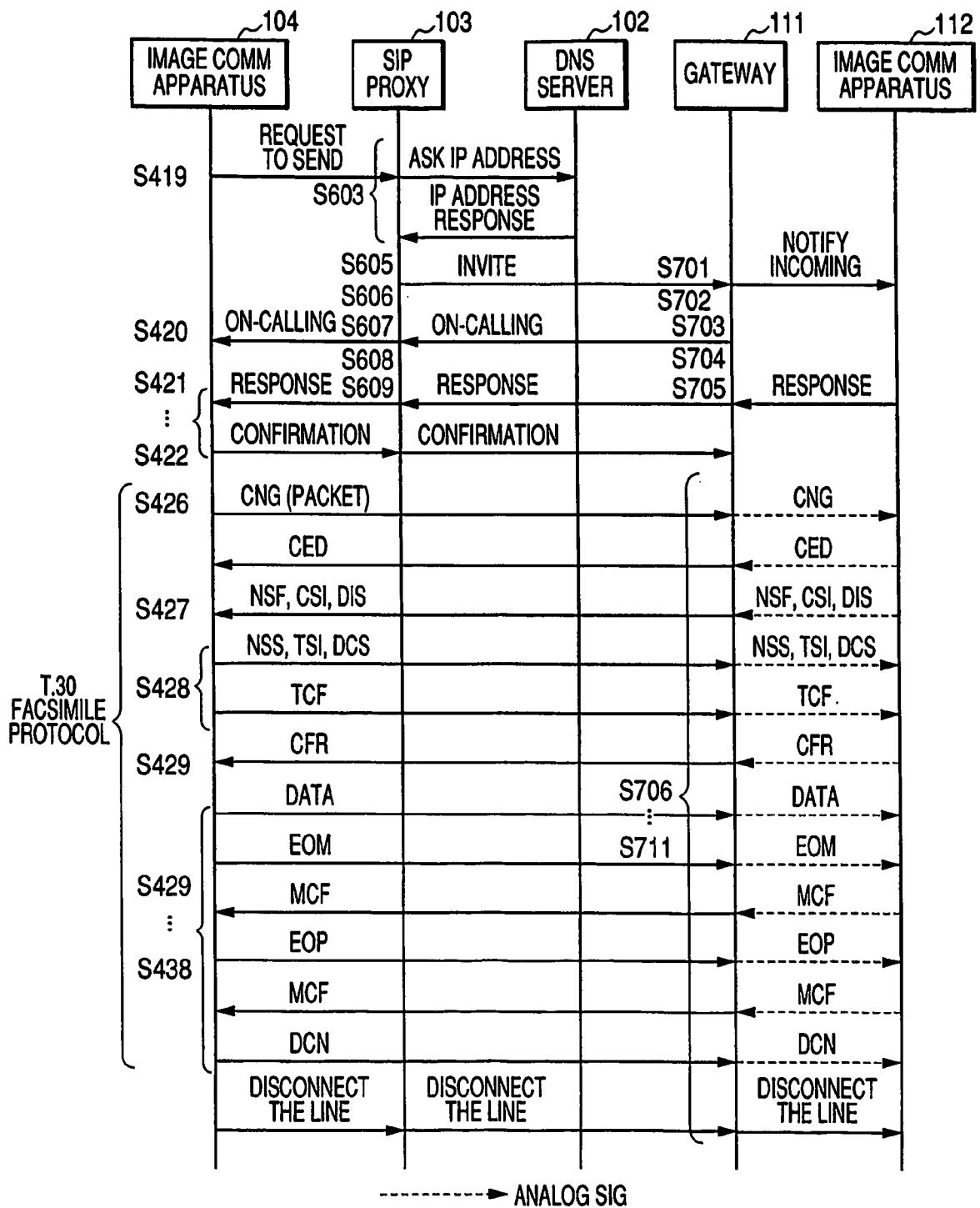
FIG. 3B is an explanatory diagram showing a communication sequence for sending an image from the image communicating apparatus 104 in FIG. 1 to an image communicating apparatus 112.
Figure 3C:
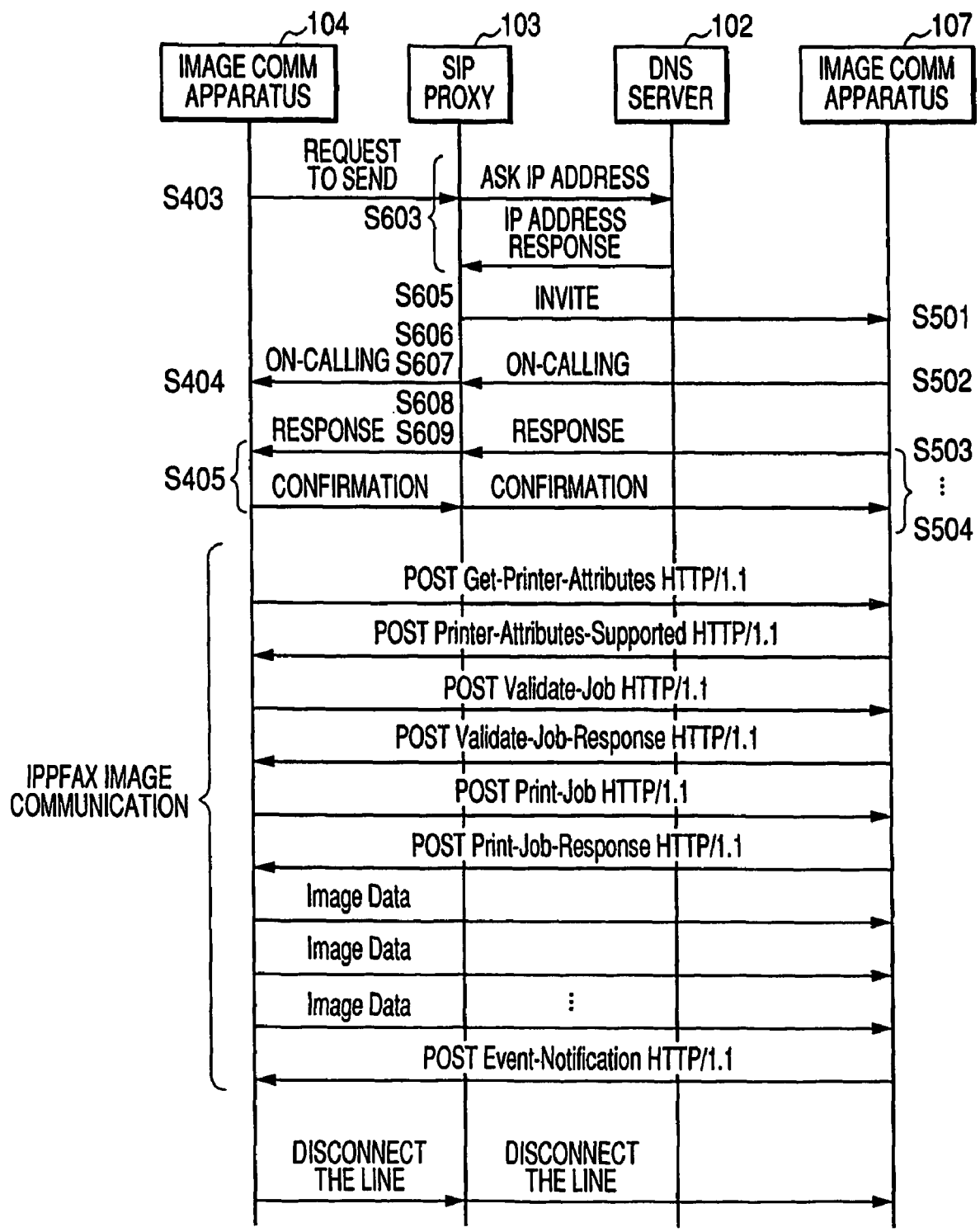
FIG. 3C is an explanatory diagram showing a different communication sequence for sending the image from the image communicating apparatus 104 in FIG. 1 to the image communicating apparatus 107.

FIGS. 3A to 3C show the communication sequences which are realized by the communication control shown in FIGS. 4A, 4B and 4C to 8. Numbers of the steps corresponding to the processes in FIGS. 4A, 4B and 4C to 8 are written.

FIG. 3A is a flowchart showing an image communication sequence with the terminal connected to the VoIP network.

FIG. 3B is a flowchart showing an image communication sequence with the terminal which is not connected to the VoIP network.

FIG. 3C is a flowchart showing an image communication sequence according to the IPPFAX.

FIG. 4A is a flowchart showing a communication control of the image communicating apparatus 104.

FIG. 4B is a flowchart showing the communication control of the image communicating apparatus 104.

FIG. 4C is a flowchart showing the communication control of the image communicating apparatus 104.

FIG. 5 is a flowchart showing a communication control of the image communicating apparatus 107.

FIG. 6 is a flowchart showing the communication control of the SIP proxy 103.

FIG. 7 is a flowchart showing the communication control of the gateway 111.

FIG. 8 is a flowchart showing a communication control of the image communicating apparatus 112.

When a destination is inputted by the key operation unit 211 of the image communicating apparatus 104 (step S401 in FIG. 4A), the number is analyzed. This analysis is performed to discriminate whether or not the communication to the destination is made via the VoIP network. For example, assuming that the number is equal to 050-1234-5678, it is determined from the number of head three digits that the communication is made to the opponent via the VoIP network (step S402). Processes in step S403 and subsequent steps are executed.

The telephone number prefix "050" of the three digits mentioned above is the number which has been predetermined as a number showing a communication company of the IP telephone using the VoIP network at present. Naturally, this regulation is valid in Japan and can be properly changed in the case where another number schedule in a foreign country or the like is applied. If the communication is not made to the destination via the VoIP network, processes of FIG. 4B, which will be explained hereinafter, are executed. Although the above discrimination has been made on the basis of the prefix of the head three digits here, the invention is not limited to it. Whether or not the opponent can communicate via the VoIP network can be also discriminated every telephone number of the opponent destination on the basis of a table in which proper discriminating conditions have been stored.

If the destination is the opponent who can communicate via the VoIP network, a part of the VoIP/SIP is used and the image communicating apparatuses 104 and 107 communicate on the IP network in accordance with the communication sequence as shown in FIG. 3A without using the analog speech line.

First, in step S403 in FIG. 4A, a session asking message (INVITE message) of the SIP (Session Initiation Protocol) in which the telephone number information has been inserted is sent via the CSMA/CD interface 106 connected to the ADSL modem. A private IP address 191.168.0.1 of the SIP proxy 103 is inserted into the sending destination address of the session asking message and the resultant sending destination address is sent.

The internal operation for sending the SIP packets is as follows. First, on the basis of the program stored in the ROM 202, the CPU 201 generates the telephone number information inputted from the key operation unit 211 as a sending destination and generates the session asking message to which the telephone number information of the image communicating apparatus 104 has been added as a header for a sending source side. Subsequently, the CPU 201 generates a frame in which the IP header including a sending destination IP address and a sending source IP address has been added to the message and transfers the frame to the LAN controller 216. "191.168.0.1" as an IP address of the SIP proxy is inserted into the sending destination IP address, "192.168.0.1" as an IP address of the image communicating apparatus 104 is inserted into the sending source IP address, and the resultant addresses are sent.

When the LAN controller 216 receives the sent data, the LAN controller adds an MAC (Media Access Control) header to it and sends the resultant data to the ADSL modem 105 (FIG. 1). The ADSL modem 105 which received the data sends the received data to the IP network 101. Various messages which are sent after that are also sent by a similar procedure.

In the case of the present packets, since the IP address of the SIP proxy has been inserted in the sending destination IP address, they are sent to the SIP proxy 103 via the IP network 101 (step S601 in FIG. 6).

The SIP proxy 103 develops the telephone number in the header of the received session asking message into a URL of "8.7.6.5.4.3.2.1.e164.arpa" (step S602) and searches the DNS server 102 (step S603). The SIP proxy 103 which received the IP address of the image communicating apparatus 107 of the opponent destination from the DNS server 102 (step S604) replaces the sending destination IP address in the packet received from the image communicating apparatus 104 with the IP address of the image communicating apparatus 107 received from the DNS server 102, replaces the sending source IP address with the IP address of the SIP proxy 103, and sends the session asking message to the image communicating apparatus 107 (step S605).

On the other hand, the image communicating apparatus 107 which received the session asking message (step S501 in FIG. 5) sends an on-calling message to the SIP proxy 103 (step S502). The sending source telephone number information described in the header of the received session asking message is inserted into the destination in a header of the on-calling message, the address of the SIP proxy 103 as a sending source IP address of the session asking message is inserted into the sending destination IP address, and the resultant address is sent.

The SIP proxy 103 which received the on-calling message (step S606 in FIG. 6) replaces the sending destination IP address with the IP address of the image communicating apparatus 104, replaces the sending source IP address with the IP address of the SIP proxy 103, and sends the resultant IP addresses (step S607). The image communicating apparatus 104 receives an on-calling message (step S404).

Subsequently, if the image communicating apparatus 107 is in the state where it can receive an image (step S503 in FIG. 5), the apparatus 107 sends a reply message to the SIP proxy 103 (step S504). The SIP proxy 103 which received the reply message (step S608) converts only the sending destination IP address into the IP address of the image communicating apparatus 104 and sends it (step S609). The image communicating apparatus 104 receives the reply message (step S405 in FIG. 4A).

The image communicating apparatus 104 can recognizes the IP address of the image communicating apparatus 107 by the sending source IP address in the received reply message (step S406). After that, the image communicating apparatus 104 can directly send the packets to the image communicating apparatus 107 without passing through the SIP proxy 103.

As mentioned above, the sending and reception of the image data between the image communicating apparatuses 104 and 107 can be started. In this case, since it has already been known from the telephone number that the opponent station has been connected to the VoIP network, it is presumed that the image communication by a non-facsimile procedure, which will be explained hereinafter, is naturally possible.

In step S407 and subsequent steps, the image data is assembled in the frame of the TCP/IP and sent. The IP address of the image communicating apparatus 107 has been added to the sending destination address. An arbitrary protocol can be used with respect to a file transfer protocol corresponding to an upper layer of the TCP/IP which is used in the image communication. For example, it is possible to use an SMTP (Simple Mail Transfer Protocol), an IPPFAX (Internet Printing Protocol FAX), an FTP (File Transfer Protocol), or an HTTP (Hyper Text Transfer Protocol) which are generally used, a dedicated method to which those protocols are applied, or the like.

In the embodiment, each of the image communicating apparatuses 104 and 107 has both functions of an SMTP client and a server therein and an image file can be transferred between those apparatuses by the SMTP. In step S407 and subsequent steps, control for sending and receiving the image data by the SMTP is shown.

Although a sending and receiving state of a communication message by the SMTP is also shown in the schematic flowchart (FIG. 4A), it is shown in more detail hereinbelow (refer to RFC821 or RFC822 with respect to the details of the SMTP message). All of those messages are sent and received on the frame of the TCP/IP. In the following sequence, "S:" indicates a text message which is sent by a sending side terminal (image communicating apparatus 104) through an SMTP port and "R:" shows a text message which is sent by a receiving side terminal (image communicating apparatus 107) through an SMTP port.

S: HELO Image Terminal 105
R: 250 Image Terminal 107
S: MAIL FROM: <192.168.0.1>
R: 250 OK
S: RCPT TO:<193.168.0.1>

R: 250 OK
S: DATA
R: 354 Start mail input; end with <CRLF>.<CRLF>
S: XXXXXXXXXXXXXX (Image Data)
S: XXXXXXXXXXXXXX (Image Data)
S: .
R: 250 OK
S: QUIT
R: 221

Prior to sending the image data, the image communicating apparatus 104 activates an SMTP handler (program) and sends a "HELO" message showing the start of the communication (step S407 in FIG. 4A). The image communicating apparatus 107 which received the "HELO" message (step S505 in FIG. 5) sends a reply message "250" showing that the message has been received (step S506 in FIG. 5).

Subsequently, the image communicating apparatus 104 sends a message "MAIL FROM <192.168.0.1> (step S408). The image communicating apparatus 107 which received this message (step S507) sends a reply message "250" showing that the message has been received (step S508).

Subsequently, the image communicating apparatus 104 sends a message "RCPT TO: <193.168.0.1> which designates the receiver (step S409). On the other hand, when the image communicating apparatus 104 receives the reply message from the image communicating apparatus 107 (steps S509, S510), it sends a "DATA" message showing the start of the sending of the data (step S410 in FIG. 4A, step S511 in FIG. 5). In response to it, the image communicating apparatus 107 sends a "354" message showing permission of the start of the sending of the data (steps S512). When the image communicating apparatus 104 receives the "354" message from the image communicating apparatus 107 (step S411), the apparatus 104 starts to send the image data (steps S412).

The image data to be sent is sent in an attached file format of E-mail. Since an MIME (Multipurpose Internet Mail Extensions) format is widely used as an attached file format of the E-mail, this format is also used in the embodiment. After the image data format is designated by the MIME header, the image data encoded by BASE64 is sent subsequent to the MIME header (portion of "S: XXXXXXXXXXXXXX (Image Data)" in the foregoing protocol sequence).

Upon sending the image data, in the image communicating apparatus 104, the CPU 201 reads out the JPEG data stored in a memory card via the card interface 214 (step S413 in FIG. 4A). Subsequently, the CPU 201 executes an encoding process of BASE64 (step S414) and transfers the coded data to the LAN controller 216 (step S415). The LAN controller 216 packetizes it every predetermined amount of data, adds the received IP address "193.168.0.1" of the image communicating apparatus 107 as a header to the packets, and sends them (step S416).

In the image communicating apparatus 107 which received the image data (step S513 in FIG. 5), unnecessary headers in an E-mail text are deleted by the process of the LAN controller 216 or the CPU 201 (step S514), a decoding process based on BASE64 is executed to the MIME-encoded portion in the E-mail text, and the JPEG data is reconstructed and stored into the RAM 203 (step S515).

When the sending of all of the JPEG data is finished (step S417 in FIG. 4A), the image communicating apparatus 104 sends an end message "QUIT" to the image communicating apparatus 107 (step S418). The image communicating apparatus 107 sends an end reply message "221" (step S517) and the communication is finished.

After that, in the image communicating apparatus 107, the JPEG data is decompressed in the JPEG processing unit 215 (step S518) and further converted into data of four colors of CMYK in the record processing unit 213 (step S519), and the image data is printed and outputted by the printer unit (step S520).

The image data can be sent at a high speed without using the facsimile protocol as mentioned above. Assuming that a size of the JPEG image data obtained by photographing the object by the digital camera is equal to 300 kbytes and an uploading transmission speed of the ADSL line is equal to 1 Mbps, a time that is required for transmission is equal to about [300 k/(1000 k/8)=2.4 seconds].

In the image communicating apparatus 104, if the telephone number inputted in step S402 in FIG. 4A is the number of the telephone line exchange network (110) such as 03-1234-5678, it is determined from this number of the head three digits that the communication is made to the opponent via the telephone line exchange network. In this case, the apparatus 104 communicates with the image communicating apparatus 112 connected to the telephone line exchange network 110 by using the media gateway 111.

First, the session asking message (INVITE message) of the SIP (Session Initiation Protocol) in which the telephone number information has been inserted is sent via the CSMA/CD interface 106 connected to the ADSL modem (step S419 in FIG. 4B). The private IP address "192.168.0.1" of the SIP proxy 103 is inserted into the sending destination address of the session asking message and the resultant sending destination address is sent.

The telephone number information which had already been inputted from the key operation unit 211 has been inserted in the destination in the header of the session asking message. The telephone number information of the image communicating apparatus 104 has been inserted in the sending source. The IP address of the SIP proxy 103 has been stored in the sending destination IP address of the IP packets in which the above message has been stored. The IP address of the image communicating apparatus 104 has been stored in the sending source IP address.

The SIP proxy 103 develops the telephone number in the header of the received session asking message into a URL of "8.7.6.5.4.3.2.1.3.0.e164.arpa" (step S602 in FIG. 6) and searches the DNS server 102 (step S603). The SIP proxy which received the IP address of the media gateway 111 for connecting to the telephone line exchange network 110 from the DNS server 102 (step S604) replaces the sending destination IP address in the packet received from the image communicating apparatus 104 with the IP address "194.168.0.1" of the media gateway 111 received from the DNS server 102, replaces the sending source IP address with the IP address of the SIP proxy 103, and sends the session asking message to the media gateway 111 (step S605).

The media gateway 111 which received the session asking message (step S701 in FIG. 7) notifies the image communicating apparatus 112 of incoming via the telephone line exchange network 110 (step S702) and, at the same time, sends an on-calling message to the SIP proxy 103 (step S703). The sending source telephone number information described in the header of the received session asking message is inserted into the destination in the header of the on-calling message, the address of the SIP proxy 103 as a sending source IP address of the session asking message is inserted into the sending destination IP address, and the resultant address is sent.

The SIP proxy 103 which received the on-calling message (step S606) replaces the sending destination IP address with the IP address of the image communicating apparatus 104, replaces the sending source IP address with the IP address of the SIP proxy 103, and sends the resultant IP addresses (step S607). The image communicating apparatus 104 receives the on-calling message (step S420 in FIG. 4B).

Subsequently, if the image communicating apparatus 112 which received the incoming notification (step S801 in FIG. 8) is in the state where it can receive an image (step S802), the apparatus 112 responds to the media gateway 111 via the telephone line exchange network 110 (step S803). The media gateway 111 which received the response (step S704) sends a reply message to the SIP proxy 103 (step S705). The SIP proxy 103 which received the reply message converts only the sending destination IP address into the IP address of the image communicating apparatus 104 and sends it and the image communicating apparatus 104 receives the reply message (step S421).

The image communicating apparatus 104 can recognize the IP address of the media gateway 111 by the sending source IP address in the received reply message (step S422). After that, the image communicating apparatus 104 can send the packets to the image communicating apparatus 112 via (the IP network 101→the media gateway 111 ... the telephone line exchange network 110) without passing through the SIP proxy 103.

As mentioned above, the sending and reception of the data can be started between the image communicating apparatuses 104 and 112 through the media gateway 111.

In the case of sending and receiving the image between the image communicating apparatuses 104 and 112 (step S423), the CPU 201 writes a predetermined value into a register in the modem codec 210, thereby switching the selector 210-5 so as to connect the tone generator unit 210-2 to the digital encoding unit 210-4 (step S424). Similarly, by writing a predetermined value into the register in the modem codec 210, the CPU 201 selects the 64 kbps PCM encoding (G.711) as an encoding method of the digital encoding unit (step S425).

The reasons why the 64 kbps PCM encoding (G.711) is selected are as follows. In the image communication between the image communicating apparatuses 104 and 112, the analog facsimile signal has to be sent from the media gateway 111 to the image communicating apparatus 112. At this time, however, for example, in the ITU-T Recommendation V.34, the analog facsimile modulation of 33.6 kbps is executed by the TCM (Trellis Coded Modulation), the obtained analog facsimile signal is converted into a digital signal, and after that, the digital signal is sent to the media gateway 111. This is because, at this time, if another VoIP encoding method of a speed lower than that of the 64 kbps PCM encoding (G.711) is used, quantization errors increase and there is a risk that the communication cannot be normally made. By using the 64 kbps PCM encoding for the digitization of the VoIP signal to be sent to the media gateway 111 as mentioned above, the certainty of the facsimile communication with the image communicating apparatus 112 can be improved. If the 64 kbps PCM encoding is used, in the case of using the analog facsimile modulation signal of a speed lower than 33.6 kbps of the TCM (actually, a number of facsimile apparatuses in which an upper limit of the analog facsimile modulation signal is equal to (or less than) about 9600 bps-14.4 kbps-28.8 kbps are used), the certainty of the communication with the image communicating apparatus 112 is further improved.

Subsequently, the tone generator unit 210-2 generates a CNG signal. The generated CNG signal is inputted to the digital encoding unit 210-4 via the selector 210-5 and encoded by the 64 kbps PCM encoding method.

The PCM coded CNG signal is transferred to the RAM 203 via the data bus by control of the CPU 201 and stored therein. Subsequently, when the PCM coded data of 512 bytes is stored, the CPU 201 generates a frame in which the IP header including the sending destination IP address and the sending source IP address has been added to the data and transfers the frame to the LAN controller 216. "194.168.0.1" as an IP address of the gateway has been inserted in the sending destination IP address and "192.168.0.1" as an IP address of the image communicating apparatus 104 has been inserted in the sending source IP address.

When the LAN controller 216 receives the sent data, it adds the MAC (Media Access Control) header and the CNG signal is sent to the ADSL modem 105 (step S426).

The packets are sent from the ADSL modem 105 which received the data to the IP network through the ADSL line. Since the sending destination IP address of the sent packets indicates the gateway, the packets are transferred to the media gateway 111 via the IP network 101.

When the media gateway 111 receives the packets from the image communicating apparatus 104 (step S706 in FIG. 7), it recognizes that the packets should be sent to the image communicating apparatus 112 via the telephone line exchange network 110, extracts the coded data from the received packets, executes a decoding process, and converts it into an analog signal (step S707). The FAX signal converted into the analog signal reaches the image communicating apparatus 112 via the telephone line exchange network. In step S709, when the media gateway 111 receives the analog signal sent from the image communicating apparatus 112, it recognizes that the analog signal should be sent to the image communicating apparatus 104, assembles the packets to the image communicating apparatus 104, and sends them (step S710). The above relaying process is continued until the line disconnection is detected (steps S708, S711).

As mentioned above, the FAX signal sent from the image communicating apparatus 104 is transmitted to the image communicating apparatus 112 and an environment that is equivalent to that in the case of making the FAX communication through an ordinary analog telephone line can be obtained. Therefore, for the image communicating apparatuses 104 and 112, processes similar to those of the conventional FAX communication are merely executed except that the FAX tone signal is PCM encoded. It is sufficient that the image communicating apparatus 112 can execute substantially the same operation as that in the conventional T.30 facsimile procedure.

The operation which is executed after the CNG signal was sent/received between the image communicating apparatuses 104 and 112 will be simply explained hereinbelow.

The image communicating apparatus 112 which received the CNG (step S804 in FIG. 8) sends a DIS (step S805). The image communicating apparatus 104 which received the DIS (step S427 in FIG. 4B) sends a DCS and a TCF (step S428). The image communicating apparatus 112 which received the DCS and TCF (step S806) sends a CFR (step S807).

When the image communicating apparatus 104 receives the CFR (step S429), the sending and reception of a tone signal are finished. Therefore, the CPU 201 switches the selector 210-5, thereby connecting the modulation processing unit 210-3 to the digital encoding unit 210-4 (step S430).

Subsequently, the CPU 201 starts the image reading operation by the read control unit 205 and the CIS 204 (step S431). In the image data sending, while the original is conveyed under control of the read control unit 205, the analog signal inputted from the CIS 204 is A/D converted (step S432). The converted image data is MH encoded and compressed by the MH processing unit 206 (step S433). Subsequently, MH coded data is inputted to the modulation processing unit 210-3 in the modem codec 210 via the data bus and modulated into an analog signal (step S434). In the embodiment, it is presumed that the coded data is modulated into the analog facsimile signal of a transmission speed of 33.6 kbps by the TCM encoding method.

The modulated data is inputted to the digital encoding unit 210-4 via the selector 210-5 and PCM encoded in the digital encoding unit (step S435). The PCM coded data is stored into the memory 203 via the data bus. Subsequently, the CPU 201 assembles a frame in which the TCP/IP header has been added to the PCM coded data and transfers it to the LAN controller 216 (step S436). The LAN controller 216 sends the TCP/IP packets to the media gateway 111 (step S437).

The media gateway 111 extracts the coded data from the received TCP/IP packets and sends it as an analog signal to the image communicating apparatus 112 via the telephone line exchange network 110 (steps S706 to S708 in FIG. 7 mentioned above).

When the sending of all image data is finished (step S438), the call is disconnected and the processing routine is finished (step S439).

In the image communicating apparatus 112 which received the image data (step S808), the received image data is demodulated by the FAX modem (step S809), decoded by the MH processing unit (equivalent to 206 in FIG. 2A) (step S810), converted into the data of four colors of CMYK by the record processing unit (equivalent to 213 in FIG. 2A) (step S811), and printed and outputted by the printer unit (step S812).

In step S423, in the case of sending a speech to the same opponent, the CPU 201 switches the selector 210-5 and connects the A/D converter 210-1 to the digital encoding unit 210-4 (step S440 in FIG. 4C). The CPU 201 writes a predetermined value into the register in the modem codec 210 (step S441) so as to use the speech encoding method determined between the image communicating apparatus 104 and the media gateway 111 at the time of connection of the call. In the embodiment, explanation is made on the assumption that 5.3 kb/sec: A-CELP (G.723.1) has been selected.

The speech inputted from the speech input/output unit 208 is converted into a digital signal by the A/D converter 210-1 and inputted to the digital encoding unit 210-4 via the selector 210-5.

In the digital encoding unit 210-4, the speech is converted into coded data of G.723.1 of the speed of 5.3 kbps (step S442). The converted data is stored into the memory 203 via the data bus. Subsequently, the frame to which the IP header has been added is assembled and, thereafter, it is transferred to the LAN controller 216 (step S443). The MAC address is added by the LAN controller 216 and the resultant frame is sent to the image communicating apparatus 112 (step S444).

The above data processes are repeated until the end of the speech. When the speech is finished (step S445), the line is disconnected (step S446) and the communication is finished.

As mentioned above, by switching the selector 210-5 in the modem codec 210 and the encoding method in accordance with the communication opponent and the communication media and using it, the efficient modulation, encoding, and communication can be realized. Combinations of them are shown in a table of FIG. 9.

As shown in FIG. 9, although the modem codec 210 is not used in image communication 901 via the IP network, different encoding methods are used in speech communication 902 via the IP network and image communication 903 via the telephone network.

Particularly, in the case of executing the image communication 903 via the telephone network, that is, when the image communicating apparatus 104 calls the image communicating apparatus 112 and makes the facsimile communication of T.30, the 64 kbps PCM encoding method which is optimum to the image communication via the IP network is used. The reasons why the 64 kbps PCM encoding method is designated here are because at a speed lower than 64 kbps (encoding method of a lower speed shown with respect to the digital encoding unit 210-4 mentioned above), there is a risk that the image transmission speed is reduced due to a fallback or the like which is caused by a failure in training. If the PCM encoding method corresponding to 64 kbps is used, an upper limit is assumed to be 33.6 kbps and in the case of the analog facsimile communication of about (9600 bps-14.4 kbps-28.8 kbps) that is equal to or lower than the upper limit value can be more certainly made.

In the speech communication 902 via the IP network (in the case where both terminals have IP connection) or speech communication 904 via the telephone network (in the case where the opponent terminal does not have the IP connection but is connected via a proper VoIP gateway), an arbitrary encoding method suitable for those speech communication is used. Particularly, in the speech communication 902 via the IP network (in the case where both terminals have IP connection), the digital encoding method determined by the negotiation which is performed on the basis of the VoIP protocol between this apparatus and the opponent station is selected and used.

As mentioned above, the analog image signal in which the image data has been facsimile-modulated can be sent to the image communicating apparatus 112 through the media gateway 111.

According to the embodiment, when the image is sent, the wasteful processing steps (FIG. 2B) of converting the signal modulated by the modem into the analog signal and, further, converting the analog signal into the digital signal through the VoIP codec are unnecessary. Moreover, by properly selecting the digital encoding method of the digital encoding means (modem codec 210) which is also used in the speech communication, particularly, by selecting the digital encoding method (in the above example, the 64 kbps PCM encoding method) that is optimum to the facsimile modulating method in the case of making the image communication with the image communicating apparatus 112 having no IP connection through the media gateway 111, the band of the VoIP digital communication can be extremely effectively used in the analog facsimile signal in a range of (9600 bps-14.4 kbps-28.8 kbps-33.6 kbps). The image communication of the high reliability can be made with the image communicating apparatus 112 through the media gateway 111.

The same digital encoding means (modem codec 210) can be used in common for the VoIP speech communication and the image communication, hardware resources can be effectively used, and the system can be simply constructed at low costs.

Although the modem codec 210 shown in FIG. 2A can be constructed as a 1-chip device, naturally, effects similar to those mentioned above can be obtained even in the case where the functions in the modem codec are distributed into different devices.

Embodiment 2

The example in which the SMTP is used as a communication protocol when the image communicating apparatus 104 sends the image to the image communicating apparatus 107 has been shown in the embodiment 1. However, similar effect can be also obtained by using other image communication protocols. For example, the "Peer to Peer" image transmission can be realized by using an IPPFAX (Internet Printing Protocol FAX).

FIG. 3C shows a communication sequence in the case of using the IPPFAX between the image communicating apparatuses 104 and 107. The sequence until the start of the image transmission is substantially the same as that in FIG. 3A. The image transmission executed by the SMTP in FIG. 3A is executed by the protocol of the IPPFAX in FIG. 3C.

Naturally, the protocol to execute the image transmission between the image communicating apparatuses 104 and 112 both having the IP connection without using the facsimile procedure is not limited to the foregoing SMTP or IPPFAX but other arbitrary protocols such as HTTP, FTP, and the like on the TCP/IP can be used.

Embodiment 3

The embodiment 1 has been described on the assumption that upon sending from the image communicating apparatus 104 to the image communicating apparatus 107, the JPEG image data in the memory card is sent, and upon sending from the image communicating apparatus 104 to the image communicating apparatus 112, the image read by the CIS is sent. However, naturally, similar effects can be also obtained by a combination opposite to that mentioned above with respect to the image inputting method in each communication.

Embodiment 4

The embodiment 1 has been described on the assumption that whether the communication is made to the terminal connected to the IP network or the terminal connected to the line exchange network is discriminated by the number of the head portion of the telephone number. However, naturally, by registering a relation between the telephone number and each type of network to which the opponent terminal is connected, the opponent terminal is discriminated and the effects similar to those mentioned above can be obtained.

INDUSTRIAL APPLICABILITY

The present invention can be applied to the communicating apparatus which makes the speech and image communication and corresponds to the analog communication path and the network communication path. Such a communicating apparatus can be constructed as a dedicated apparatus and also embodied by using the image input/output unit such as scanner, camera interface, and the like and hardware such as a PC (personal computer) and the like having a network interface. Particularly, in the case of using the PC hardware, the method and the program of the invention can be implemented into such PC hardware via a proper storing medium or a network.

This application claims priority from Japanese Patent Application No. 2003-308189 filed on Sep. 1, 2003, which is hereby incorporated by reference herein.

The invention claimed is:

1. A communicating apparatus for digitally encoding a speech signal by digital encoding means and sending the coded signal to an opponent station, thereby making VoIP speech communication and sending image data to the opponent station, comprising:

discriminating means for discriminating whether the image data is sent to the opponent station through a gateway on an opponent station side; and communication control means for, when the image data is sent to the opponent station, in accordance with a result of said discriminating means that the image data is not sent through the gateway, selecting a first image communicating procedure by which the image data is not facsimile-modulated but sent to the opponent station on an IP network on the basis of a predetermined IP communication protocol by using an IP address of the opponent station obtained from a predetermined server on the basis of a telephone number of the opponent station, and in accordance with a result of said discriminating means that the image data is sent through the gateway, selecting a second image communicating procedure by which the image data is facsimile-modulated by a predetermined facsimile modulating method, an analog facsimile signal obtained by said facsimile modulation is digitally encoded by said digital encoding means, and subsequently, the digital coded signal is sent to the opponent station utilizing a PCM encoding method of at least 64 kbps through the gateway for executing analog/digital signal conversion between the IP network and a public line network, wherein in said second image communicating procedure, the digital encoding method of said digital encoding means is switched to the digital encoding method suitable for said facsimile modulating method, and a tone signal necessary for a facsimile communication procedure or the facsimile-modulated transmission image data is input to said digital encoding means.

2. A communicating apparatus according to claim 1, wherein when the image data is sent to the opponent station, which one of said first and second image communicating procedures is used is determined by analyzing the telephone number of the opponent station.

3. A communicating apparatus according to claim 1, wherein in said VoIP speech communication, the digital encoding method of said digital encoding means is selected on the basis of negotiation which is performed on the basis of a VoIP protocol.

4. A communicating apparatus according to claim 1, wherein in the second image communication procedure, said communication control means switches the digital encoding method of said digital encoding means to a digital encoding method suitable for said facsimile modulating method, and causes said digital encoding means to digitally encode an analog facsimile signal obtained by said facsimile modulation.

5. A control method executed by a communicating apparatus for digitally encoding a speech signal by digital encoding means and sending the coded signal to an opponent station, thereby making VoIP speech communication and sending image data to the opponent station, the method comprising:

discriminating whether the image data is sent to the opponent station through a gateway on an opponent station side; and a communicating control step of, when the image data is sent to the opponent station, in accordance with a result of said discriminating step that the image data is not sent through the gateway, selecting a first image communicating procedure by which the image data is not facsimile-modulated but sent to the opponent station on an IP network on the basis of a predetermined IP communication protocol by using an IP address of the opponent station obtained from a predetermined server on the basis of a telephone number of the opponent station, and in accordance with a result of said discriminating step that the image data is sent through the gateway, selecting a second image communicating procedure by which the image data is facsimile-modulated by a predetermined facsimile modulating method, an analog facsimile signal obtained by said facsimile modulation is digitally encoded by said digital encoding means, and subsequently, the digital coded signal is sent to the opponent station utilizing a PCM encoding method of at least 64 kbps through the gateway for executing analog/digital signal conversion between the IP network and a public line network, wherein in said second image communicating procedure, the digital encoding method of said digital encoding means is switched to the digital encoding method suitable for said facsimile modulating method, and a tone signal necessary for a facsimile communication procedure or facsimile-modulated transmission image data is input to said digital encoding means.

6. A control method of the communicating apparatus according to claim 5, wherein when the image data is sent to the opponent station, which one of said first and second image communicating procedures is used is determined by analyzing the telephone number of the opponent station.

7. A control method of the communicating apparatus according to claim 5, wherein in said VoIP speech communication, the digital encoding method of said digital encoding means is selected on the basis of negotiation which is performed on the basis of a VoIP protocol.

8. A control method of communicating apparatus according to claim 5, wherein in the second image communication procedure, the digital encoding method of said digital encoding means is switched to a digital encoding method suitable for said facsimile modulating method, and said digital encoding means digitally encodes an analog facsimile signal obtained by said facsimile modulation.

9. A non-transitory computer-readable storage medium on which is encoded a control program to be executed by a communicating apparatus for digitally encoding a speech signal by digital encoding means and sending the coded signal to an opponent station, thereby making VoIP speech communication and sending image data to the opponent station, the program comprising:

a discriminating step of discriminating whether the image data is sent to the opponent station through a gateway on an opponent station side; and a communicating control step of, when the image data is sent to the opponent station, in accordance with a result of said discriminating step that the image data is not sent through the gateway, selecting a first image communicating procedure by which the image data is not facsimile-modulated but sent to the opponent station on an IP network on the basis of a predetermined IP communication protocol by using an IP address of the opponent station obtained from a predetermined server on the basis of a telephone number of the opponent station, and in accordance with a result of said discriminating step that the image data is sent through the gateway, selecting a second image communicating procedure by which the image data is facsimile-modulated by a predetermined facsimile modulating method, an analog facsimile signal obtained by said facsimile modulation is digitally encoded by said digital encoding means, and subsequently, the digital coded signal is sent to the opponent station utilizing a PCM encoding method of at least 64 kbps through the gateway for executing analog/digital signal conversion between the IP network and a public line network, wherein in said second image communicating procedure, the digital encoding method of said digital encoding means is switched to the digital encoding method suitable for said facsimile modulating method, and a tone signal necessary for a facsimile communication procedure or facsimile-modulated transmission image data is input to said digital encoding means.

10. A computer-readable storage medium according to claim 9, wherein when the image data is sent to the opponent station, which one of said first and second image communicating procedures is used is determined by analyzing the telephone number of the opponent station.

11. A computer-readable storage medium according to claim 9, wherein in said VoIP speech communication, the digital encoding method of said digital encoding means is selected on the basis of negotiation which is performed on the basis of a VoIP protocol.

12. A computer-readable storage medium according to claim 9, wherein in the second image communication procedure, the digital encoding method of said digital encoding means is switched to a digital encoding method suitable for said facsimile modulating method, and said digital encoding means digitally encodes an analog facsimile signal obtained by said facsimile modulation.

* * * * *